United States Patent
Dochterman

[15] 3,670,405
[45] June 20, 1972

[54] METHOD OF MAKING A DYNAMOELECTRIC MACHINE HAVING IMPROVED HOUSING, BEARING AND SUPPORT STRUCTURE

[72] Inventor: Richard W. Dochterman, Fort Wayne, Ind.
[73] Assignee: General Electric Company
[22] Filed: Jan. 29, 1970
[21] Appl. No.: 6,664

[52] U.S. Cl..................................29/596, 29/509, 29/522, 29/523, 310/42, 310/90
[51] Int. Cl........................................................H02k 15/00
[58] Field of Search.................29/596, 602, 509, 522, 523; 310/42, 89, 90

[56] References Cited

UNITED STATES PATENTS

| | | | |
|---|---|---|---|
| 3,500,087 | 3/1970 | Wendt | 310/90 |
| 2,215,882 | 9/1940 | Maloney | 29/509 UX |
| 1,792,897 | 2/1931 | De Lacy | 29/523 UX |
| 2,398,532 | 4/1946 | Keehn | 29/509 UX |
| 2,626,581 | 1/1953 | Almgren et al. | 29/522 UX |
| 2,815,255 | 12/1957 | Phillips et al. | 29/522 UX |
| 3,015,682 | 1/1962 | Cheske | 29/522 UX |
| 3,451,367 | 6/1969 | Henrickson | 29/522 UX |
| 2,522,985 | 9/1950 | Bradley | 308/132 |
| 1,444,751 | 2/1923 | Mueller | 29/596 UX |
| 3,050,832 | 8/1962 | Scheldorf | 29/596 |
| 3,167,672 | 1/1965 | Tupper | 310/90 |

FOREIGN PATENTS OR APPLICATIONS 646,075  9/1962  Italy..........................................310/90

Primary Examiner—John F. Campbell
Assistant Examiner—Carl E. Hall
Attorney—John M. Stoudt, Radford M. Reams, Ralph E. Krisher, Jr., Frank L. Neuhauser and Oscar B. Waddell

[57] ABSTRACT

A stator assembly is pressed into a housing member having an end frame and bearing receiving chamber. Bearing means sized to close tolerances have angularly spaced apart surface areas secured to an interior wall of the bearing receiving chamber and define lubricant transmitting channels therewith. The bearing means are slidably received in the chamber and secured therein by an interference fit or structural adhesive material. An oil cover is mechanically secured to an end frame by fasteners expanded in openings in the frame. The openings may be used, prior to securement of the oil cover, to permit removal of rotor centering shims from the machine air gap. In a preferred arrangement, the fasteners are secured to the frame without the application of substantial resultant forces to the end frame and bearing means.

1 Claim, 10 Drawing Figures

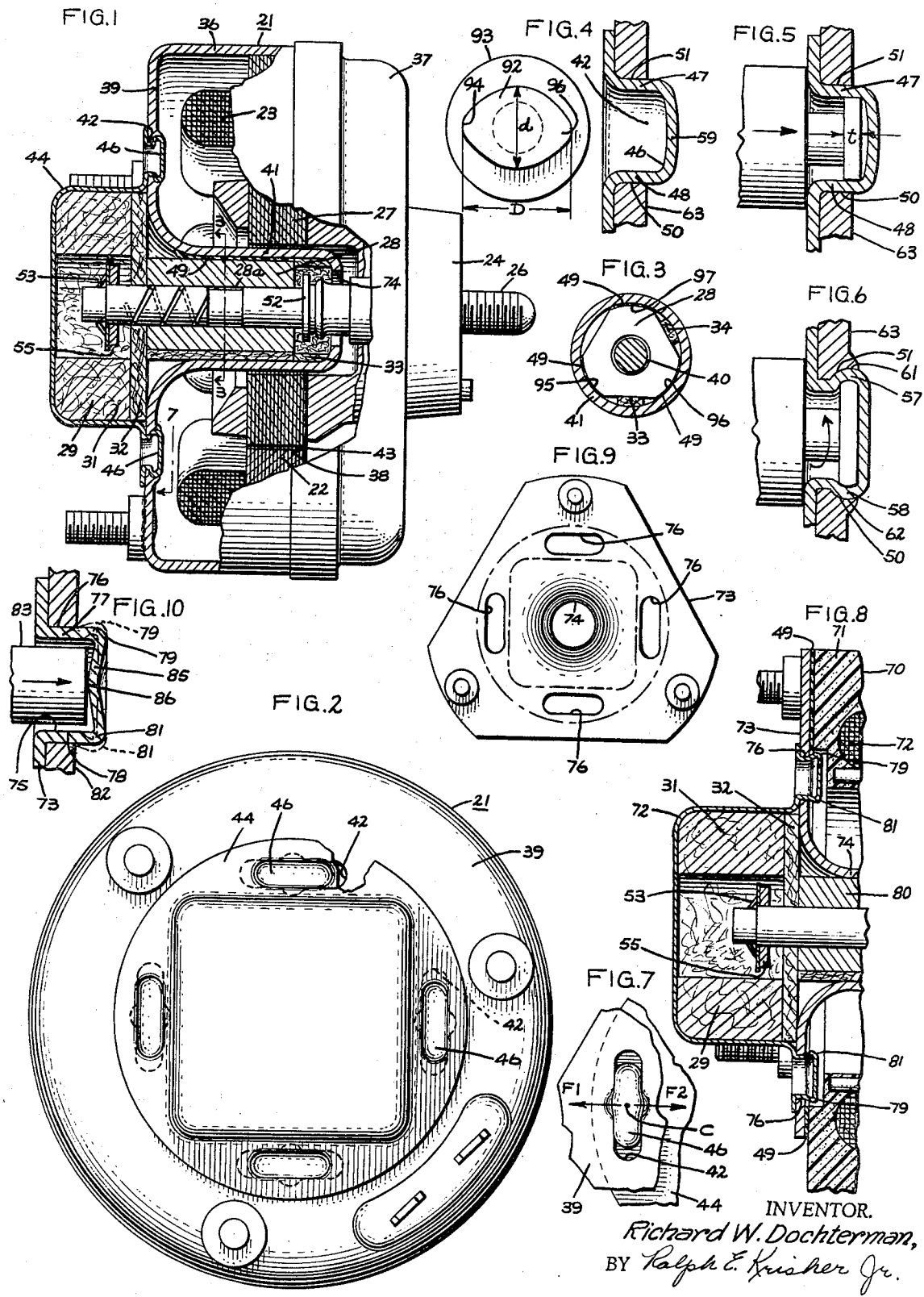

METHOD OF MAKING A DYNAMOELECTRIC MACHINE HAVING IMPROVED HOUSING, BEARING AND SUPPORT STRUCTURE

CROSS-REFERENCE TO RELATED APPLICATIONS

Dochterman et al., application Ser. No. 6,666 entitled "Improved Dynamoelectric Machine and Method of Making Same" and Dochterman application Ser. No. 6,660 entitled "Wet Motor," both of which applications were filed on the same day as this application, are related applications.

BACKGROUND OF THE INVENTION machined

This invention relates to inductive devices and more particularly to dynamoelectric machines having housing means and having end frame supported bearing means and to a method of making the same.

Inductive devices, e.g., dynamoelectric machines, normally include a housing surrounding and protecting a stator assembly and bearing means supported by an end frame secured to or formed integrally with the housing. Cast metal, as well as drawn sheet metal parts, have been used heretofore to fabricate such housings and end frames. The use of drawn or otherwise formed parts is generally the less costly approach because of machining operations that must be performed on cast parts. However, additional manufacturing steps such as welding, brazing, swedging, or staking have then been used to secure suitable bearing means, e.g., sleeve bearings, to the sheet metal end frames. Then, in order to provide bearing surfaces sized to very close tolerances, bearing means have been machines or sized after being secured to the end frames. This in turn has required that provision be made for handling the end frame in addition to the bearing while sizing the bearing, since very close bearing tolerances previously attained have, heretofore, been destroyed during assembly of the bearing with a bearing support. Thus, it would be desirable to provide an improved arrangement whereby a drawn metal end frame and sleeve bearing having surfaces thereof previously sized to very close tolerances may be quickly and easily secured together without reducing the previously attained tolerances.

It would also be desirable to provide lubricant transmitting passages along a sleeve bearing so that lubricant can be fed or returned from one end of the bearing to the other end thereof. In one type of inductive device more commonly referred to as a motor, covers are sometimes secured to a motor end frame in order to provide a sealed oil reservoir. An example of one approach followed heretofore to accomplish this result is illustrated in Lindt U.S. Pat. No. 3,304,448 and another is illustrated in Thompson et al. U.S. Pat. No. 3,176,712. When oil covers are pressed onto or adhesively secured to a drawn sheet material motor end frame during final assembly, care must be employed to insure that the end frame is not accidentally stressed or deformed with the result that the bearing means previously secured thereto become stressed or misaligned relative to the bore of the motor.

As pointed out, for example, in the just mentioned Thompson et al.patent, and as will be understood, numerous advantages may be obtained by shimming a rotor in the bore of a dynamoelectric machine and then permanently securing assembly of the machine with a structural adhesive bonding material. However, this procedure often necessitates the provision of openings in an end frame to be used during removal of the rotor centering shims. In the case of a so called totally enclosed motor, such shim removal openings must be subsequently covered or closed.

Thus it would be desirable to provide means for securing an oil cover to an end frame that could be employed with a drawn sheet material end frame without deleteriously affecting previously established bearing alignment. It would be even more desirable for such means to cover or close shim removal or other unwanted openings in an end frame of a dynamoelectric machine.

SUMMARY OF THE INVENTION

Accordingly, it is an object of this invention to provide an improved method of making a dynamoelectric machine wherein a first member is permanently secured against separation from a second member.

A further object of the present invention is to provide such a method whereby two members may be secured together against relative movement in a desired direction by stressing at least one of the members with forces applied substantially only in a direction normal to such one direction.

Another object of the present invention is to provide improved means and methods for securing an oil cover to a dynamoelectric machine member wherein fasteners formed as part of the oil cover are expanded in place in openings in the member to secure the cover thereto.

In carrying out the objects of the invention in one form, there is provided a dynamoelectric machine, such as an electric motor, having a stator pressed into a unitary or one piece housing member, end frame, and bearing receiving chamber. A previously sized sleeve bearing is permanently secured in the bearing receiving chamber by a structural adhesive bonding material and a rotor is supported by the bearing and concentrically positioned in the air gap of the machine. In another form, a sleeve bearing is pressed into a bearing receiving chamber in a drawn steel end frame and the end frame is secured with a structural adhesive bonding material to a dynamoelectric machine housing means.

By another aspect of the invention, an oil cover is mechanically secured to an end frame of the dynamoelectric machine by means of fasteners formed in the oil cover that, for purposes of exemplification, are expanded in openings formed in the end frame. The end frame openings may have been used, prior to securement of the oil cover, to permit removal of rotor centering shims from the air gap of the machine. Thus, the openings may be employed for permitting shim removal and securement of the oil cover, while the fasteners on the oil cover may be employed for closing such openings to form a totally enclosed machine and for securing the oil cover to the end frame. In a preferred form, the fasteners facilitate the application of equal and oppositely directed fastener stressing forces.

The subject matter which I regard as my invention is particularly pointed out and distinctly claimed in the concluding portion of this specification. The invention, itself, however, both as to its organization and method of operation, together with further objects and advantages thereof may best be understood by reference to the following description taken in connection with the accompanying drawing.

BRIEF DESCRIPTION OF THE DRAWING

FIG. 1 is a side elevation, with parts in section and parts broken away, of a dynamoelectric machine assembled in accordance with a preferred form of the invention; FIG. 2 is a rear view of the dynamoelectric machine of FIG. 1 assuming FIG. 1 to be shown in full;

FIG. 3 is a view taken along the line 3—3 of FIG. 1, assuming FIG. 1 to be shown in full;

FIGS. 4, 5, and 6 schematically represent the steps of one method that may be followed, and a tool that may be used, in the practice of the invention;

FIG. 7 is a view taken along the line 7—7 of FIG. 1 and rotated 90°, assuming FIG. 1 to be shown in full;

FIG. 8 is a sectional view, with parts broken away, of another dynamoelectric machine embodying the invention;

FIG. 9 is a rear view of an end frame and bearing support member shown in FIG. 8; and FIG. 10 is a schematic representation of the steps of another method that may be followed in the practice of the invention.

DESCRIPTION OF THE PREFERRED EMBODIMENT

Referring now to the drawing, and particularly to FIGS. 1–3, there is illustrated a dynamoelectric machine of the general type known as a unit bearing motor and made in accordance with my invention. The motor 21 includes a stator assembly constructed of a laminated core 22 and at least one winding. Each of the core laminations has an annular yoke section and angularly spaced apart integral teeth or salient polar projections arranged inwardly of the yoke section defining respectively enlarged winding accommodating slots between adjacent poles. The winding slots extend entirely through the core and accommodate a winding 23.

A rotor 24 carried by a shaft 26 is built of laminated magnetic material 27 and provided with a squirrel cage type secondary winding or conventional design. For furnishing proper lubrication for the bearing 28, a suitable arrangement may be provided as illustrated which includes lubricant retention means in the form of an oil reservoir 29 containing a lubricant absorbing packing material 31 which may be of any suitable material, such as wool felt. Wicks 32 of wool felt or other suitable material feed lubricant to the shaft 26 and strips 33, 34, of similar or the same material, return oil from the bearing and shaft to the reservoir 29. The strips 33, 34 are contained in channels between the bearing and bearing receiving chamber. Surrounding and protecting the stator assembly is a housing 36 drawn from a single piece of suitable material such as low carbon steel and a drawn steel winding cover 37. The stator assembly is secured with a interference fit to the housing 36, and, after the rotor 24 is loosely positioned in the bore 38 of the stator assembly, the winding cover 37 is secured to the housing 36 with an interference fit. As will be understood, interference fit is meant to describe a means of securement wherein one member is pressed fitted into another member or wherein a member is shrink fitted around another member.

As will be appreciated from an inspection of FIG. 1, and end frame 39 is formed as an extension of the housing 36 and a hollow bearing receiving chamber 41 is formed as an extension of the end frame. The chamber 41 is illustrated as a cylindrical chamber (i.e., circular in shape as viewed in cross section), and extends within the bore 38 of the stator assembly. The end frame 39 and bearing receiving chamber 41 thus provide a means for supporting a pre-sized bearing, e.g., a bearing that has been previously manufactured to very close tolerances, such as plus or minus 0.0002 of an inch. Since the bearing surfaces 40 of bearing 28 may be closely sized prior to placement of the bearing 28 in the chamber 41, relatively low cost automated apparatus may be used to produce the bearing means. With the illustrated arrangement, the dimensions of the bearing 28 are not altered during placement and securement of the bearing in the bearing receiving chamber 41 even when the bearing 28 is of the powdered metal type. Thus, the dimensional accuracy of the bearing 28 is not affected during placement or securement in the chamber 41. This provides an advantage over prior arrangements wherein dimensions of powdered metal type bearings are altered during assembly with a bearing support, which then has necessitated the performance of subsequent sizing operations to provide assembled bearings dimensioned to tolerances corresponding to those attained in the exemplification without such subsequent sizing.

A plurality of apertures or openings 42 are formed in the end frame 39 and are axially aligned with the air gap 43 around the rotor. These apertures provide, prior to securement of the oil cover 44 to the end frame 39, an unobstructed path for the removal of shims used to center the rotor in the air gap.

Although the following described assembly steps of the motor 21 could be altered so that the shims could be removed from the outboard end of the motor followed by assembly of the winding cover 37; in cases where this procedure is not convenient or practical, as in the case of two bearing totally enclosed type motors, such openings would facilitate shim removal. In addition, even in the case of motors similar to motor 21, if the winding cover 37 and housing 36 are to be painted and then dried while the structural adhesive material 49 is being hardened, the openings 42 permit subsequent shim removal.

As best illustrated in FIG. 3, the sleeve bearing 28 has a noncircular outer surface and is slidably positioned in the chamber 41 and secured at angularly spaced apart surfaces 95, 96, 97 to the chamber by a cured or hardened structural adhesive bonding material 49, illustrative examples of which are set forth in the previously identified Thompson et al. patent. A thrust washer 52 is placed on the shaft before placement of the bearing 28 on the shaft, and after such bearing placement, a lock nut 53 is used to fasten a second thrust washer 55 to the shaft.

At this stage of assembly, the wool felt wicking and reservoir material is positioned as illustrated. If not previously done, the shims used to center the rotor in the air gap may now be removed along the path between the openings 42 in the end frame and the air gap. Then the reservoir material is filled with oil, and the oil cover 44 is loosely assembled with fastening means illustrated as expandable fasteners 46 projecting through the openings.

As best revealed in FIGS. 4–6, the fasteners 46 are formed with a pair of generally oppositely facing sections 47, 48 and the openings 42 are shaped to receive these sections without interference. After the sections 47, 48 of the fasteners are positioned adjacent to selected surfaces 50, 51 of the end frame that are adjacent to and define the openings 42, a noncircular, e.g., eccentric or elliptical, head 92 of an expanding tool 93 is positioned in a pocket defined by the generally oppositely facing sections of each fastener, and then rotated relative to the fastener so that the working portions 94, 96 of the tool head engage the oppositely facing sections and stress, e.g., expand, portions 57, 58 of those sections as shown in FIG. 6. In actual practice, relatively little force has been required to deform the fasteners and the tool 93 has been easily turned or rotated by hand. After deforming a fastener, the tool is either backed off or rotated an additional 90° and removed. After this has been done to all of the expanding fasteners on the oil cover 44, assembly of the oil cover with the frame is complete.

This technique has been performed in actual practice with parts and tools having the illustrated relative configurations. For purposes of description, one oil cover was drawn from about 0.025 of an inch thick low carbon drawing steel and the end frame was made from .060 of an inch thick low carbon drawing steel. The openings 42 measured about three-sixteenths by five-eights of an inch and the fasteners projected about one-fourth of an inch into the openings 42. The external width of the fasteners 42 was slightly less than the width of the slots, e.g., about five thirty-seconds of an inch and the external length of the fasteners was about one-half of an inch. The head of the tool 93 had a thickness corresponding to the dimension in FIG. 5 of about one-sixteenth of an inch and the face of the tool was substantially as illustrated in FIG. 4, with a major dimension D of about 0.177 of an inch and a minor dimension of about 1.147 of an inch. The face of the tool 93 was dimensioned so that the tool would slip fit between the fastener sections 47, 48 and, when turned, deform the portions 57, 58 of sections 47, 48 nominally about 0.015 of an inch. When two members were actually fastened at four locations as illustrated in FIG. 2, it was found that a force of over 1,000 pounds was required to break them apart.

It will be appreciated that the foregoing has been set forth for purposes of exemplification and that variously dimensioned and shaped fasteners, openings, and expanding tools may be used. For example, it a tool that expanded and collapsed in place were used, the fasteners could be cylindrical in form. In addition, it is not necessary, from the standpoint of fastening, for the fasteners to be hollow fasteners and form closed pockets, e.g., have a closed end 59. Thus, the fasteners could be formed as open pockets with a pair of oppositely facing tabs or ears pierced and formed in the cover 44.

As will be appreciated from an inspection of FIG. 6, the material in the portions 57, 58 of sections 47, 48 as well as material along selected surfaces 50, 51 adjacent the openings 42 is deformed beyond its elastic limit. Thus, expansion of the sections 47, 48 or portions 57, 58 thereof has formed interlocking recessed surface regions or depressions 61, 62 in the surfaces 50, 51 of the end frame adjacent to and on opposite sides of the opening 42. These surface regions accomodate the deformed portions of the fastening means as best shown in FIG. 6. Although this interlocking relationship has been observed in practice, it should be specifically understood that portions of the fastener sections 47, 48 extending beyond the rear surface 63 of the end frame could be deformed without causing a concurrent deformation of the end frame and interlock the fastener with the surface 63. In this case, the deformed or expanded portions 57, 58 would form means clamped against spaced parts of the surface 63 adjacent to and on opposite sides of the opening.

With reference to FIG. 7, it will be understood that the point C represents the approximate location of the center of the face 92 of the tool 93. While in use, the stressing forces represented by vectors F1, F2 exerted by the tool 93 against the sections 47, 48 will be equal in magnitude and oppositely directed so that they will counteract each other. Thus, any net resultant forces applied to the end frame 39 would be caused only by the torque required to turn the tool 93.

In view of the foregoing, it will be appreciated that two members, e.g., the oil cover and end frame have been secured against separation along a line parallel to the longitudinal axis of the tool 93 without applying a force to the end frame 39 directed along such line.

By arranging the bearing 28 and chamber 41 so that they are secured to one another at angularly spaced apart locations, lubricant transmitting channels are conveniently formed between the bearing and the internal chamber walls. This arrangement yields still another advantage when a bearing is to be slidably received and pressed into the chamber in that the interference area between the internal chamber wall and external bearing surface is reduced so that less force need be exerted on the bearing during placement in the chamber than would be the case if the bearing were cylindrical. Furthermore, these advantages are obtained when the bearing chamber and end structure are separately formed elements which are subsequently assembled together.

Still another motor 70 embodying the invention is illustrated in FIG. 8 wherein the housing means comprises an interstitial mass 71 of particulate material secured together and to the stator assembly 72 with an adhesive bonding material 49. The particulate material is preferably sand. Specific examples and selection criteria for the particulate and adhesive bonding materials are fully set forth in my copending "Wet Motor" application Ser. No. 6,660.

In the motor 70, the end frame is illustrated as a generally triangular shaped end frame 73 having a bearing receiving chamber 74 extending therefrom and which slidably or telescopically receives a press fitted pre-sized sleeve bearing 80. Assembly of the end frame 73 with the housing is attained by means of a structural adhesive bonding material 49 such as that described and referred to hereinabove. The rotor, lubrication system, and thrust system of the motor 71 are all identical to the corresponding components in the motor 21 and identical numerals have been used to identify such components.

The oil cover 72, however, is secured or fastened with fastening means shown in detail in FIG. 9, wherein the expandable fastener 75 is initially formed with a segment 85 interconnecting the spaced apart sections 77, 78. The segment 85 includes a coined or otherwise formed convex, expandable end surface 86 as shown in full lines in the drawing. Then, after insertion of the fasteners in the openings 76 of the end frame, the oppositely facing sections 77, 78 of the fastener are stressed, and deformed beyond the elastic limit of the material therein, by stressing forces transmitted by the segment 85 so that portions 79, 81 of the sections move to the dotted line position shown in the drawing. When expanded, portions 79, 81 of the oppositely facing sections 77, 78 are stressed against the spaced surface areas of the rear portion 82 of the end frame on opposite sides of the opening 76. This expansion may be effected by any suitable tools, such as a plane faced punch 83 and hammer. The expansion or straightening of the segment 85 by the tool 83 results in the application of substantially equal and oppositely directed stressing forces to the portions 79, 81 of the fastener 75.

It will now be appreciated that the fasteners illustrated in the drawing could be employed in a wide range of environments and devices other than inductive devices. In addition, although the fastener shown in FIGS. 6 and 7 is suitable for widespread use, the fastener illustrated in FIG. 9 is more suitable for use in applications where the transmission of an expanding force to a member, e.g., a motor end frame, can be tolerated without adverse affect, e.g., misalignment of a previously assembled bearing. Accordingly, the fastener of FIG. 9 is more suitable for relatively rigidly supported structural members such as the end frame 73 in FIG. 8.

While in accordance with the Patent Statutes, I have described what at present is considered to be the preferred embodiment of my invention, it will be obvious to those skilled in the art that numerous changes and modifications may be made therein without departing from the invention.

What I claim as new and desire to secure by Letters Patent of the United States is:

1. A method of assembling a dynamo-electric machine comprising a stator assembly defining a bore, a rotor, a bearing supporting the rotor in the bore, and end frame having at least one opening therein and disposed across one end of the bore and supporting the bearing, and an oil cover secured to the end frame by deformable fastening means, the method comprising the steps of: assembling together the rotor, bearing, and end frame with the rotor positioned in predetermined relationship with the bore of the stator assembly; positioning the oil cover on the end frame with the deformable fastening means projecting into the at least one opening in the end frame; and subsequently stressing and permanently deforming the fastening means to establish deformed portions thereon and permanently deforming at least one surface of the end frame defining said opening to form recessed surface regions in which the deformed portions of the fastening means are accomodated thereby establishing an interlocking engagement between the end frame and the fastening means to prevent subsequent separation of the oil cover from the end frame.

* * * * *